(12) United States Patent
Fried (10) Patent No.: US 8,961,684 B2
(45) Date of Patent: Feb. 24, 2015

(54) PRODUCTION OF COAL COMBUSTION PRODUCTS FOR USE IN CEMENTITIOUS MATERIALS

(71) Applicant: Ash Improvement Technology Inc., Maspeth, NY (US)

(72) Inventor: Wayne Fried, Maspeth, NY (US)

(73) Assignee: Ash Improvement Technology Inc., Maspeth, NY (US)

(*) Notice: Subject to any disclaimer, the term of this patent is extended or adjusted under 35 U.S.C. 154(b) by 59 days.

(21) Appl. No.: 13/740,959

(22) Filed: Jan. 14, 2013

(65) Prior Publication Data

US 2013/0125792 A1     May 23, 2013

Related U.S. Application Data

(63) Continuation-in-part of application No. 12/889,100, filed on Sep. 23, 2010, now Pat. No. 8,741,054.

(60) Provisional application No. 61/245,594, filed on Sep. 24, 2009, provisional application No. 61/585,698, filed on Jan. 12, 2012.

(51) Int. Cl.
   *C04B 18/04*     (2006.01)
   *C04B 18/06*     (2006.01)
   (Continued)

(52) U.S. Cl.
CPC . *C04B 18/06* (2013.01); *F23J 7/00* (2013.01); *C04B 28/02* (2013.01); *C04B 18/084* (2013.01); *Y10S 106/01* (2013.01)

USPC .......... 106/745; 106/705; 106/714; 106/716; 106/718; 106/737; 106/738; 106/DIG. 1

(58) Field of Classification Search
CPC .......... C04B 18/04; C04B 18/08; C04B 14/10
USPC ......... 106/745, 705, 714, 716, 718, 737, 738, 106/DIG. 1
See application file for complete search history.

(56) References Cited

U.S. PATENT DOCUMENTS 3,437,329 A    4/1969   Ostberg et al.
3,909,283 A    9/1975   Warnke
(Continued)

FOREIGN PATENT DOCUMENTS

DE    42 10 224 C1    5/1993
EP    0 022 318 A1    1/1981
(Continued)

OTHER PUBLICATIONS

Kraisha et al., "Coal Combustion and Limestone Calcination in a Suspension Reactor", Chemical Engineering Science, 1992, pp. 993-1006, vol. 47, No. 5.

(Continued)

*Primary Examiner* — Paul Marcantoni
(74) *Attorney, Agent, or Firm* — Alan G. Towner, Esq.; Pietragallo Gordon Alfano Bosick & Raspanti, LLP (57) ABSTRACT

A method and system for producing modified coal combustion products are disclosed. The additives reduce the particle sizes of the coal combustion product and may reduce the amount of un-burned carbon in the coal combustion product, making the modified product useful as an addition to cementitious materials.

19 Claims, 3 Drawing Sheets

(51) Int. Cl.
*F23J 7/00* (2006.01)
*C04B 28/02* (2006.01)
*C04B 18/08* (2006.01)

(56) References Cited

U.S. PATENT DOCUMENTS

| | | | |
|---|---|---|---|
| 4,026,717 A | 5/1977 | Harris et al. |
| 4,081,285 A | 3/1978 | Pennell |
| 4,174,974 A | 11/1979 | Fondriest |
| 4,238,237 A | 12/1980 | Jarrett et al. |
| 4,260,421 A | 4/1981 | Brown et al. |
| 4,318,744 A | 3/1982 | Dodson |
| 4,396,432 A | 8/1983 | Rostoker |
| 4,508,573 A | 4/1985 | Harris |
| 4,600,438 A | 7/1986 | Harris |
| 5,078,593 A | 1/1992 | Schreiber, Jr. et al. |
| 5,160,539 A | 11/1992 | Cochran |
| 5,336,317 A | 8/1994 | Beisswenger et al. |
| 5,849,075 A | 12/1998 | Hopkins et al. |
| 5,968,254 A | 10/1999 | Dodgen et al. |
| 6,038,987 A | 3/2000 | Koshinski |
| 6,250,235 B1 | 6/2001 | Oehr et al. |
| 6,395,054 B1 | 5/2002 | Edlinger |
| 6,468,345 B1 | 10/2002 | Zhu et al. |
| 6,749,681 B1 | 6/2004 | Burdis et al. |
| 6,764,544 B2 | 7/2004 | Oates et al. |
| 6,869,473 B2 | 3/2005 | Comrie |
| 7,037,368 B2 | 5/2006 | Hoffis |
| 7,141,112 B2 | 11/2006 | Comrie |
| 7,294,193 B2 | 11/2007 | Comrie |
| 7,670,139 B2 | 3/2010 | Hance et al. |
| 8,110,039 B2 | 2/2012 | Hunt |
| 8,133,317 B2 | 3/2012 | Hirao et al. |
| 8,206,504 B2 | 6/2012 | Bethani |
| 8,293,005 B2 | 10/2012 | Barbour |
| 8,741,054 B2 | 6/2014 | Fried |
| 2002/0017224 A1 | 2/2002 | Horton |
| 2003/0154887 A1 | 8/2003 | Oates et al. |
| 2003/0233962 A1 | 12/2003 | Dongell |
| 2004/0035330 A1 | 2/2004 | Oates et al. |
| 2005/0066860 A1 | 3/2005 | Logan et al. |
| 2006/0032408 A1 | 2/2006 | Strabala |
| 2006/0034743 A1 | 2/2006 | Radway et al. |
| 2007/0184394 A1 | 8/2007 | Comrie |
| 2007/0224109 A1 | 9/2007 | Chaifetz et al. |
| 2009/0151604 A1 | 6/2009 | Hirao et al. |
| 2013/0125791 A1 | 5/2013 | Fried et al. |
| 2013/0125799 A1 | 5/2013 | Fried et al. |

FOREIGN PATENT DOCUMENTS

| | | |
|---|---|---|
| JP | 8 059311 | 3/1996 |
| KR | 950 003 212 | 2/1995 |
| WO | 2008012438 A2 | 1/2008 |
| WO | 2011103371 A2 | 8/2011 |

OTHER PUBLICATIONS

Tokyay, "Strength prediction of fly ash concretes by accelerated testing", Cement and Concrete Research, 1999, pp. 1737-1741, vol. 29.

Reda Taha et al., "The Use of Pozzolans to Improve Bond and Bond Strength", Proceedings of the 9th Canadian Masonry Symposium, 2001.

Ishom et al., "Behaviors of Ashes in Pressurized Fluidized Bed Combustion of Coal", Reprints of Symposia—American Chemical Society, Division of Fuel, Jan. 1, 2002, pp. 811-813, vol. 47, No. 2.

FIG. 1

FIG. 2
PARTICLE SIZE DISTRIBUTION OF ADDITIVES

PRODUCTION OF COAL COMBUSTION PRODUCTS FOR USE IN CEMENTITIOUS MATERIALS

CROSS-REFERENCE TO RELATED APPLICATION

This application is a continuation-in-part of U.S. patent application Ser. No. 12/889,100 filed Sep. 23, 2010, which claims the benefit of U.S. Provisional Patent Application Ser. No. 61/245,594 filed Sep. 24, 2009. This application also claims the benefit of U.S. Provisional Patent Application Ser. No. 61/585,698 filed Jan. 12, 2012. All of these applications are incorporated herein by reference.

FIELD OF THE INVENTION

The present invention relates to coal combustion products, and more particularly relates to the production of coal combustion products having improved properties for use in cementitious materials.

BACKGROUND INFORMATION

Concrete and other hydraulic mixtures used for construction rely primarily on the manufacture of Portland cement clinker as the main binder controlling the rate of development of mechanical properties. The manufacture of Portland cement clinker is energy intensive and releases large amounts of carbon dioxide into the atmosphere. To reduce the environmental impact of cement and concrete manufacture, supplementary materials with lower carbon dioxide footprint may be used to partially replace Portland cement clinker as the binder in hydraulic mixtures.

Large amounts of coal ash and other coal combustion products are generated worldwide from the burning of coal as fuel for electricity generation and other energy intensive applications. Unfortunately, the use of coal ash and other coal combustion products in concrete has many drawbacks. For example, addition of fly ash to concrete results in a product with low air entrainment and low early strength development. A critical drawback of the use of fly ash in concrete is that initially the fly ash significantly retards the development of mechanical properties of the concrete. Tests conducted by Ravindrarajah and Tam (1989, Fly Ash, Silica Fume, Slag, and Natural Pozzolans in Concrete, SP-114, American Concrete Institute, Detroit, pp. 139-155) showed that the compressive strengths of fly ash concrete at early ages are lower than those for the control concrete, which is a general property of concrete or mortar when coal ash is added. Most of the reported studies tend to show a lower concrete strength due to the presence of coal ash.

Yet another critical drawback is that fly ashes can contain high levels of free carbon, measured as loss on ignition (LOI) or by other analytical methods, such as thermogravimetric analysis. The presence of excessive carbon levels inhibits the action of chemical additives used as air entrainment agents in concrete. Air entrainment in concrete is essential to ensure the durability of concrete under repeated freeze-thaw cycles. Hence, the use of combustion products in concrete is limited by the presence of free carbon.

In practice, these drawbacks prevent the economical use of coal ash at higher substitution levels than 25 to 30 percent in most construction concrete. As a result, a large amount of coal combustion byproducts are disposed of in landfills, at a high economical and environmental cost. Existing methods to beneficiate coal ash so as to make it suitable for other uses, such as in construction, generally do not enable 100 percent usage of coal ashes in beneficial applications. Furthermore, existing treatment methods commonly either use cost ineffective application of chemicals, or require treatment at a separate facility from where the coal combustion takes place, therefore incurring additional transportation costs and capital investments. Currently, most changes made to beneficiate coal combustion products are strictly related to the cleaning or sequestration of harmful chemicals within the coal combustion product. Some methods involve the use of external grinding facilities to reduce the particle size of combustion product particles. Other existing methods include carbon burn-out methods, utilizing the application of heat to the combustion product to reduce the levels of free carbon. Yet other methods utilize electrolytic methods to sequester carbon atoms. All of the aforementioned methods require high capital and ongoing costs in building and operating separate facilities.

The present invention has been developed in view of the foregoing and to remedy other deficiencies of the prior art.

SUMMARY OF THE INVENTION

The present invention provides a method and system for producing modified coal combustion products for addition to concrete, mortar and other hydraulic mixtures comprising Portland cement clinker and coal combustion products for use in construction and other industries. The invention provides a method for decreasing the particle size and increasing the total surface area of the resulting combustion product, thus increasing the rate of development of mechanical properties in hydraulic mixtures containing such combustion products. The invention further relates to the improvement of combustion efficiency resulting from the smaller particle size and resulting increased surface area of coal particles, and the dilution effect of the original combustion product after addition of the aforementioned materials, both leading to lower levels of total free carbon in the resulting combustion product.

An embodiment of the invention provides for the selection and addition of raw materials to be added in a coal combustion process to increase the reactivity of the resulting coal combustion products without any retarding effects on the alite hydration in Portland cement clinker used together with said coal combustion products in a hydraulic mixture. Currently, limestone is added to the combustion chamber of coal burning boilers to reduce sulfur emissions from flue gases to achieve sulfur removal rates range from 75 to 95 percent, however with very limited, if any, improvement of the development of mechanical properties when used with Portland cement clinker in a hydraulic mixture.

An aspect of the present invention is to provide a method of producing a modified coal combustion product comprising combusting coal and a particle size-reducing additive, wherein the modified coal combustion product has an average particle size less than an average particle size of a coal combustion product combusted from the coal without the additive.

Another aspect of the present invention is to provide a system for producing a modified coal combustion product comprising a combustion chamber for co-combusting coal and a particle size-reducing additive, a source of the coal, a source of the particle size-reducing additive, and at least one injector configured to deliver the coal and the particle size-reducing additive to the combustion chamber.

These and other aspects of the present invention will be more apparent from the following description.

DETAILED DESCRIPTION

In accordance with embodiments of the present invention, additives containing calcium oxide, alumina, silica, magnesium oxide, titanium oxide, ferrous oxides and the like are co-combusted with coal to produce modified coal combustion products. The average particle size of the modified coal combustion product is smaller than an un-modified coal combustion product. The "average particle size" may be determined by the standard procedure of ASTM B822-10 Standard Test Method for Particle Size Distribution of Metal Powders and Related Compounds by Light Scattering.

The raw material particles are typically much larger than the resulting coal combustion product particles, indicating that the intense high-temperature mixing causes particle reduction/attrition both through intense collisions as well as through chemical combustion. For example, the average particle size of the modified combustion product may be less than 50 microns, typically less than 20 or 10 microns, while the average particle size of at least some of the starting additive materials may be greater than 20 or 50 or 100 microns. In certain embodiments, the average particle size of the modified coal combustion product is at least 5 percent less than an average particle size of a coal combustion product combusted from similar coal without the additive, for example, at least 15 percent less.

In accordance with an embodiment of the invention, a coal fired boiler can be used as a co-generator to produce both heat for electrical power generation as well as excess heat, combustion synthesis, and thermal blending to produce a highly reactive pozzolanic powder in the form of the modified coal combustion product having reduced particle sizes. A comparison of the starting material particle size and the resulting product particle size demonstrates that a combination of combustion and comminution within the boiler takes place, rapidly reducing large oxide materials into fine powders. Moreover, the combustible additives may blend with the fume from the coal combustion to permit the formation of a chemically enhanced coal ash.

The raw materials for use as the additives may be derived either from industrial waste streams or not, and may include recycled concrete dust, ground blast steel slag, fine ground soda lime glass, fine ground E glass, fine ground geopolymer cements, blends and mixes of fly ash and high alkali chemicals in the presence of heat, or any other materials which increase levels of silica or alumina in the resulting fly ash.

The raw materials may also be used to decrease the levels of total free carbon in the resulting combustion ash. Such carbon-reducing materials can be derived either from industrial waste streams or not, and may include recycled concrete dust, ground blast steel slag, fine ground soda lime glass, fine ground E glass, fine ground geopolymer cements, blends and mixes of fly ash and high alkali chemicals in the presence of heat, or any other materials which increase levels of silica or alumina in the resulting fly ash. In certain embodiments, the modified coal combustion product has a carbon content less than a carbon content of a coal combustion product combusted from similar coal without the additive. For example, the carbon content of the modified coal combustion product may be at least 10 weight percent less than the untreated coal, typically, at least 50 weight percent less. The carbon content of the modified coal combustion product may be less than 5 weight percent, for example, from 0.5 to 2 weight percent.

In accordance with the present invention, selected types and amounts of metal oxide strength enhancing additives are used as raw materials that undergo co-combustion with coal to produce a useful cement additive material having controlled amounts of calcium oxide, silicon dioxide and aluminum oxide. Table 1 lists the relative amounts of strength enhancing metal oxides, expressed in terms of CaO, $SiO_2$ and $Al_2O_3$, that are present in combustion products in accordance with embodiments of the present invention. The terms "CaO", "$SiO_2$" and "$Al_2O_3$" appearing in Table 1 and used herein mean the relative weight percentages of calcium oxide, silica and alumina contained in the cement additive material in accordance with the ASTM C114 standard.

TABLE 1

| | Relative Weight Percentages | | |
|---|---|---|---|
| | Typical | Preferred | More Preferred |
| CaO | 20-80 | 22.5-70 | 25-65 |
| $SiO_2$ | 5-60 | 10-57.5 | 15-55 |
| $Al_2O_3$ | 5-40 | 7.5-30 | 10-25 |

In accordance with embodiments of the present invention, the coal may comprise bituminous coal and/or sub-bituminous coal. For bituminous coal, the relative amounts of CaO, $SiO_2$ and $Al_2O_3$ present in the modified combustion product typically range from about 20 to about 60 weight percent CaO, from about 25 to about 60 weight percent $SiO_2$, and from about 5 to about 30 weight percent $Al_2O_3$. For example, the relative amounts of CaO, $SiO_2$ and $Al_2O_3$ in the bituminous coal combustion product may range from about 25 to about 50 weight percent CaO, from about 30 to about 55 weight percent $SiO_2$ and from about 10 to about 25 weight percent $Al_2O_3$. For sub-bituminous coal, the relative amounts of CaO, $SiO_2$ and $Al_2O_3$ present in the modified combustion product typically comprise from about 47.5 to about 70 weight percent CaO, from about 10 to about 40 weight percent $SiO_2$, and from about 5 to about 30 weight percent $Al_2O_3$. For example, the relative amounts of CaO, $SiO_2$ and $Al_2O_3$ in the sub-bituminous coal combustion product may range from about 50 to about 65 weight percent CaO, from about 15 to about 35 weight percent $SiO_2$, and from about 10 to about 25 weight percent $Al_2O_3$.

The additives producing the CaO, $SiO_2$ and $Al_2O_3$ levels above may be low cost minerals, including waste products containing calcium oxide, silicon dioxide and/or aluminum oxide that can be beneficiated by virtue of the temperatures in a combustion chamber such as a coal fired boiler when injected in the system at selected particle sizes, dosage and temperature levels. In one embodiment, combinations of additives are selected from limestone, concrete including waste concrete such as recycled Portland cement concrete, kaolin, recycled ground granulated blast furnace slag, recycled crushed glass, recycled crushed aggregate fines, silica fume, cement kiln dust, lime kiln dust, weathered clinker, clinker, aluminum slag, copper slag, granite kiln dust, rice hulls, rice hull ash, zeolites, limestone quarry dust, red mud, fine ground mine tailings, oil shale fines, bottom ash, dry stored fly ash, landfilled fly ash, ponded fly ash, sopodumene lithium aluminum silicate materials, lithium-containing ores and other waste or low-cost materials containing calcium oxide, silicon dioxide and/or aluminum oxide.

In accordance with certain embodiments of the present invention, the additives may comprise one or more of the following materials: 7-20 weight percent limestone; 1-5 weight percent ground granulated blast furnace slag; 1-5 weight percent crushed concrete; 0.1-2 weight percent crushed glass; 0.1-5 weight percent kaolin; and 0.01-1 weight percent silica fume. The additives typically comprise at least 8 weight percent of the combined total weight of the coal and the additives, for example, greater than 10 weight percent.

The additives may be provided in desired particle size ranges and introduced into the combustion chamber in the same region as the coal, or in other regions. One embodiment of the present invention uses the coal fired boiler of an electric power plant as a chemical processing vessel to produce the coal combustion products, in addition to its normal function of generating steam for electrical energy. This approach may be taken without reducing the efficiency of the boiler's output while, at the same time, producing a commodity with a controlled specification and a higher commercial value to the construction market. The resulting ash product may be designed to have beneficial properties for use in conjunction with Portland cement, or with different chemical modifications also producing a pozzolan that could also be a direct substitution for Portland cement. In both cases, advantages may be both economic and environmental. Landfill needs are reduced, and cost savings result by avoiding transportation and land filling of the ash. In addition, to the extent that the ash replaces Portland cement, it reduces the amount of carbon dioxide and other toxic emissions generated by the manufacture of Portland cement.

Figure 1:
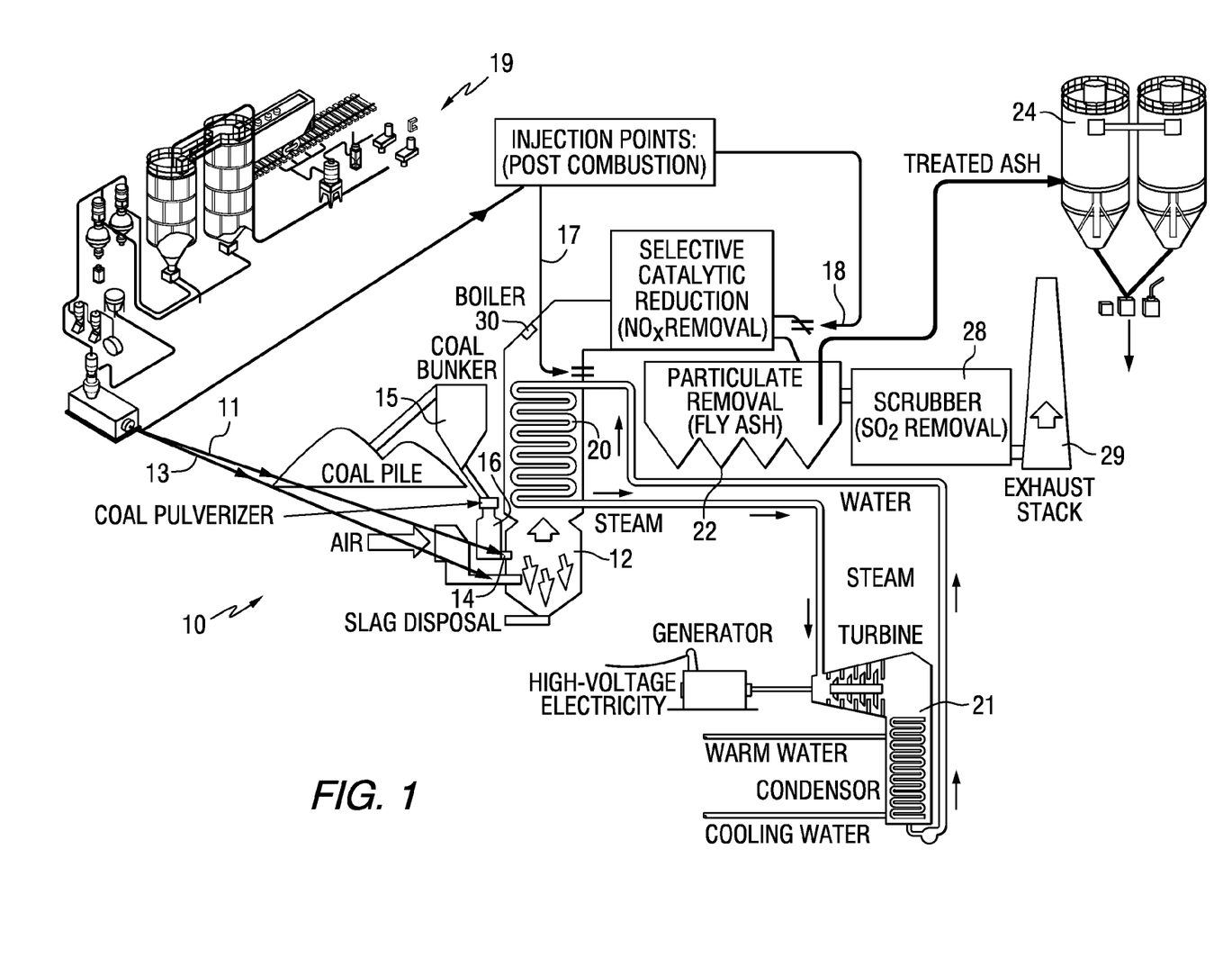
FIG. 1 is a partially schematic diagram of certain elements of a coal-fired power plant in which coal combustion products are produced in accordance with an embodiment of the present invention.

FIG. 1 schematically illustrates certain elements of a coal-fired power plant 10. The power plant includes a combustion chamber 12 such as a conventional tangential firing burner configuration. Pulverized coal is introduced into the combustion chamber 12 via at least one coal inlet line 14. A coal hopper 15 feeds into a coal pulverizer 16 which comminutes the coal to the desired particle size for introduction into the combustion chamber 12. The pulverized coal may be mixed with hot air and blown through the inlet(s) 14 into the combustion chamber 12 where the coal is burned.

The additives may be introduced into the combustion chamber 12 from a source of additives such as a delivery system 19 via a feed line 11 that feeds into the pulverizer 16 or coal feed line 14 and/or via another feed line 13 that feeds into the bottom region of the combustion chamber 12. Alternatively, the additives may be fed separately through one or more additional inlet lines 17 and 18. The additive delivery system 19 may comprise conventional particulate material storage hoppers, metering systems and delivery systems for delivering the additives to the feed lines 11 and/or 13, and/or to the additional inlet lines 17 and 18.

Water flows through tube-lined walls of the boiler 20, where it is heated by the combusted fuel to form steam that passes to a steam turbine 21. Combustion products pass from the boiler region to a particulate collection region 22 where the solid combustion products are collected and transferred to hoppers 24. Exhaust gas passes through a scrubber 28 and is vented through a stack 29. At least one sensor 30 may be provided in or downstream from the combustion chamber 12.

Coal fly ash is essentially formed from the combustion gases as they rise from the combustion zone and coalesce above that zone. Typically, when temperatures are in the range of 1,800-2,200° F., these gases form predominantly amorphous hollow spheres.

In accordance with the present invention, chemical additives like those listed can be added directly to the boiler in such a way that an ash from coal can be enhanced for optimum ash performance. In certain embodiments, additives such as clays, including kaolin, can be added to the boiler. Such materials may not decompose and recombine with the ash, but rather may be thermally activated and intimately mixed through the highly convective flow patterns inherent in the boiler. The result is a uniform ash/additive blend achieved completely through the boiler combustion process, and requiring no secondary processing. Essentially, as the vapor from the combusted products coalesce when they rise from the high temperature zone, glassy calcia-alumina-silicates will form. Vaporized additives dispersed in the plume will become part of the glassy phase, while those that have not vaporized will act as nuclei for the coalescing vapors. Other additives that do not take part with the glassy phase formation may be intimately mixed with the ash, producing a highly reactive pozzolanic mixture. For example, kaolin introduced in the boiler may not take part in the ash formation, but may transform to metakaolin, an otherwise costly additive.

The intimate blending of the additives directly into a boiler permits the combustion synthesis of the additives together with the coal and relies upon the intimate mixing generated by the convective flow in or near the boiler to produce chemically modified fly ash. This blending may take place in the main combustion zone of the boiler, directly above the main combustion zone in the boiler, or downstream from the boiler. For example, additives such as kaolin, metakaolin, titanium dioxide, silica fume, zeolites, diatomaceous earth, and the like may be added at such downstream locations at other points where the coal combustion products coalesce into amorphous fly-ash particles. In one embodiment, relatively low cost kaolin may be added and converted into metakaolin during the process, thereby resulting in the economical production of metakaolin having desirable strength enhancing properties when added to cement. By virtue of the materials selected as additives to the fuel, the resulting ash byproduct can be designed to have a chemical structure that will enable it to act as a cementitious binder together with Portland cement for strength enhancing properties of a cement or a concrete.

In another embodiment, geopolymer cements may be added in the combustion process to reduce pollutants in flue gas. Such geopolymer cements may serve as binding agents for mercury, heavy metals, nitrogen oxides and sulfur oxides, and additional silica.

It is through the injection of these additions that the resultant fly ash formed in the coal combustion process may be modified by the inclusion of the chemical compounds within these additives directly into the coalescing fly ash. In addition, some chemical species added in this manner that do not become chemically bound to the coalescing fly ash are intimately blended with the fly ash through the natural convection in the boiler resulting in a very uniform blending process achieved without the need for secondary, cost intensive, powder blending of the resultant ash product.

In another embodiment, a method is provided for testing the resulting coal combustion ash after addition of other materials and adjusting the combustion parameters and materials to reach target levels of calcium oxide, silicon dioxide and aluminum oxide in the resulting coal combustion ash. Such testing and adjusting may include measuring contents of calcium oxide, silicon dioxide and aluminum oxide and other reactive and non-reactive elements directly. The method also may include measuring properties of concrete made from the resulting coal combustion ash so as to determine early strength, late strength, slump and setting time of the concrete made of the resulting coal combustion ash. The measurements may be coupled to algorithms to rapidly assess the data and make changes to the feed rates in real time.

The testing methods may measure components such as calcium oxide, silicon dioxide and aluminum oxide and other reactive and non-reactive elements using x-ray diffraction (XRD) methods, including Rietvield analysis, x-ray fluorescence (XRF) or any other methods to identify said components. Such methods can be used in-line or end-of-line. Methods to measure strength (early and late), set time and slump can be derived from methods provided in ASTM standards relative to the measurement of such properties, or measures of heat of hydration through calorimeters, or measures of conductivity, or ultrasonic methods, or any other method that can measure or infer any of the aforementioned properties.

In one embodiment, the incorporation of sensors in a boiler that can monitor the in-situ quality/chemistry of an ash product as it is being generated. The sensors can include conventional residual gas analyzers, x-ray fluorescence spectrometers, mass spectrometers, atomic absorption spectrometers, inductively-coupled plasma optical emission spectrometers, Fourier transform infrared spectrometers, and lasers for performing laser induced breakdown spectroscopy, as well as mercury analyzers, $NO_x$ detectors and $SO_x$ detectors. The levels of gases, etc. measured by such techniques can be linked to the optimum chemistry of an ash product.

The sensors can provide real-time monitoring feedback to a human controller or an automated analysis system. For example, the sensor(s) may transmit the value of a measured property to a controller which compares the measured value to a reference value and adjusts the flow rate of the strength enhancing material based thereon. The controller may transmit a signal to one or more additive injectors in order to increase or decrease the flow rate of the additive into the combustion zone. The purpose of this feedback system is to link directly to the individual sources of chemical additives and adjust their feed rates to maintain the ash chemistry quality required for optimum concrete performance.

Using gas analysis equipment during the modified coal combustion process, it is also possible to measure the effluent gases generated by the coal combustion process. Typically, these gases include $NO_x$, $SO_x$, $CO_2$, and mercury. Through prior analysis of these gas ranges, taken together with the resulting ash reactivity, it is possible to use gas monitoring processes to optimize the addition of the chemical additives. In this way, an optimum reactive ash chemistry can be adjusted in-situ, that is in real time during the coal combustion process, to optimize the chemistry of the resulting coal ash.

The modified combustion products of the present invention may be added to various types of cement, including Portland cement. For example, the combustion products may comprise greater than 10 weight percent of the cementitious material, typically greater than 25 weight percent. In certain embodiments, the additive comprises 30 to 95 weight percent of the cementitious material.

The following examples are intended to illustrate various aspects of the invention, and are not intended to limit the scope of the invention.

EXAMPLES

Figure 2:
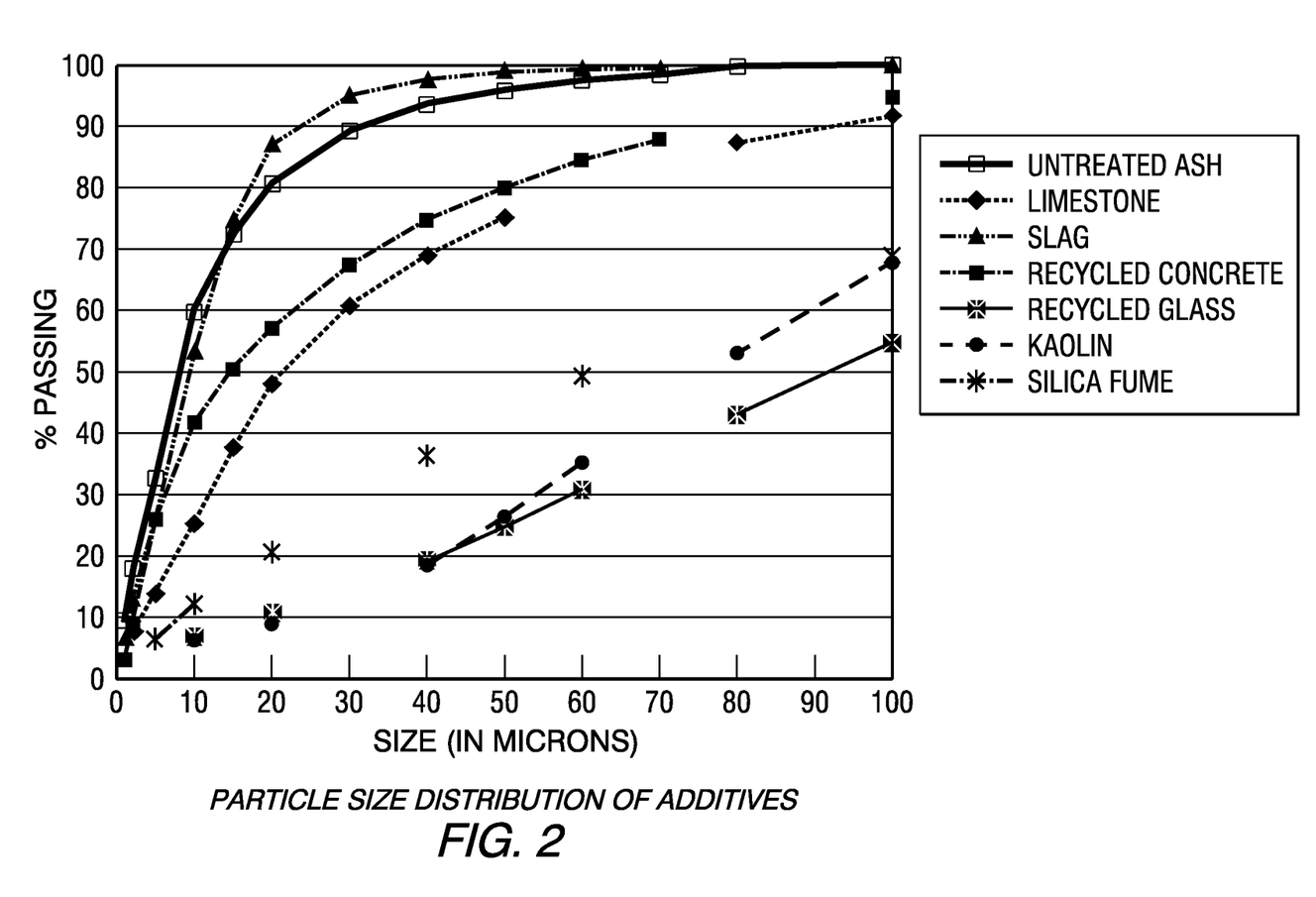
FIGS. 2 and 3 are graphs of particle size distributions of additives and the particle size distributions of the combustion products obtained by the addition of such additives in various combinations and dosages in accordance with the embodiments of the present invention.
Figure 3:
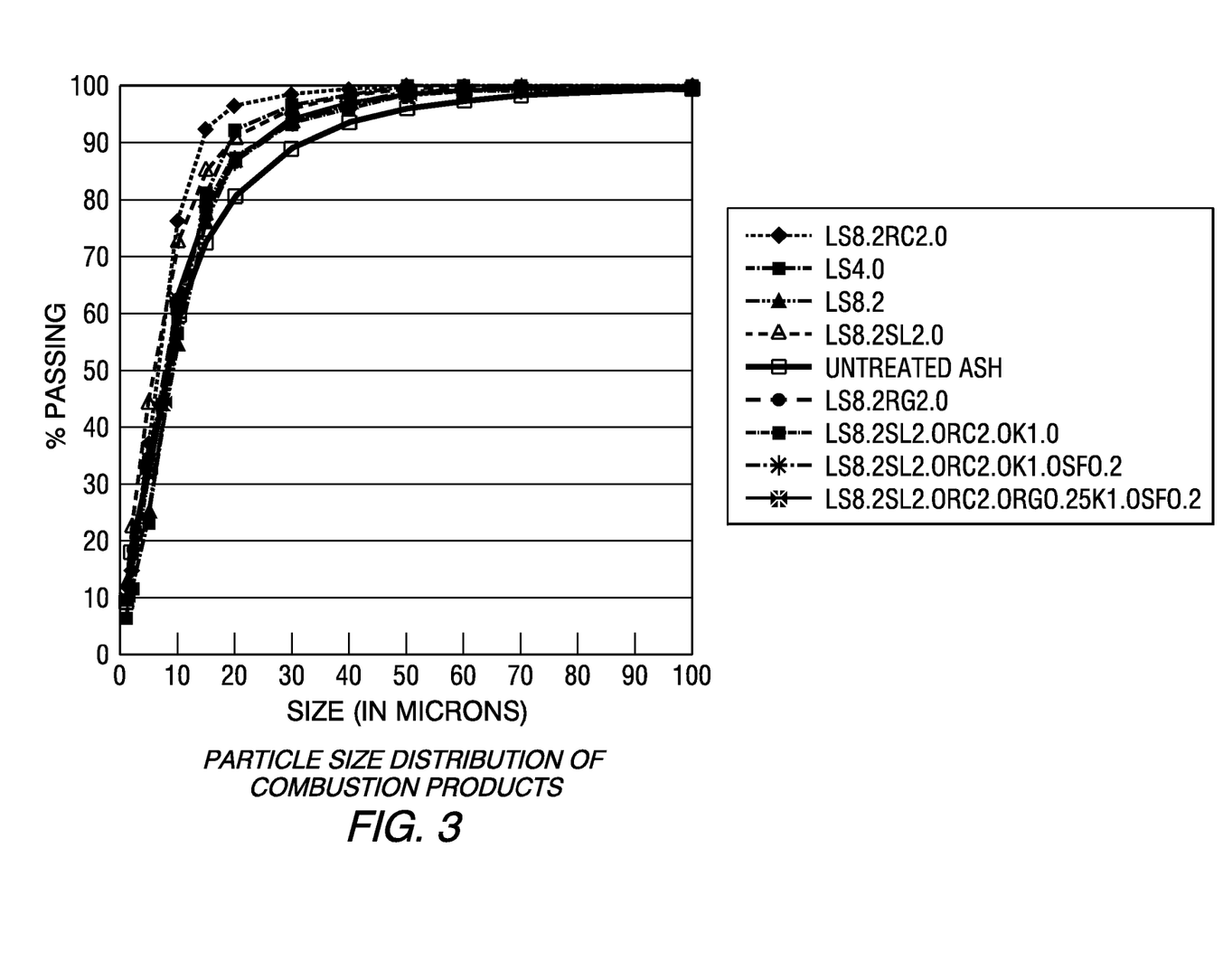

Limestone, crushed recycled concrete, granulated blast furnace slag, crushed glass, kaolin and silica fume with particle sizes as shown in Table 2 and FIG. 2 were used as additives and were injected in a test boiler in various combinations and dosage levels. Table 3 and FIG. 3 show the particle size distribution of the resulting combustion products. All particle size distributions were determined by following the standard the procedure set forth in ASTM B822-10. The nomenclature used in Table 2 and FIG. 2 is as follows: LS: limestone; RC: crushed concrete; SL: granulated blast furnace slag; RG: crushed glass; K: kaolin; and SF: silica fume. The nomenclature used for the combustion products as shown in Table 3 and FIG. 3 is as follows: AX BY CZ, etc. where A, B & C are additives as shown in Table 3, and X, Y and Z are the dosage levels in percent by weight of coal of such additives. For example, LS8.2 RC2.0 is the combustion product obtained by injecting into the boiler the additives limestone at 8.2 percent by weight of coal, and crushed concrete at 2.0 percent by weight of coal.

As can be seen from Table 2 and FIG. 2, all additives injected, except the granulated blast furnace slag, are coarser than the untreated combustion product obtained without injection of any additives. In FIG. 3 and Table 3, it can be seen that all resulting combustion products, regardless of the combination of additives and dosages used, are finer than the untreated combustion product. This shows the communition of particles from additives and particles from the combusting coal, resulting in a combustion product that is finer than both the additives and the untreated combustion product.

TABLE 2

Raw Materials

| Additive Size (microns) | Untreated Ash | Limestone | Slag | Recycled Concrete | Recycled Glass | Kaolin | Silica fume |
|---|---|---|---|---|---|---|---|
| 1 | 9.26 | | 6.45 | 3.1 | | | |
| 2 | 17.8 | 7.41 | 12.9 | 8.97 | | | |
| 5 | 32.7 | 13.9 | 25.9 | 25.9 | | | 6.43 |
| 10 | 59.8 | 25.3 | 53.2 | 41.8 | 6.78 | 6.27 | 12.4 |
| 15 | 72.3 | 37.6 | 74.7 | 50.4 | | | |
| 20 | 80.6 | 48 | 87 | 57.1 | 10.7 | 8.93 | 20.7 |
| 30 | 89.2 | 60.7 | 95.1 | 67.4 | | | |
| 40 | 93.6 | 68.8 | 97.6 | 74.5 | 19.2 | 18.5 | 36.3 |
| 50 | 96.1 | 75.2 | 98.8 | 80 | 24.8 | 26.3 | |
| 60 | 97.5 | | 99.3 | 84.3 | 30.8 | 35.2 | 49.3 |
| 70 | 98.4 | | 99.4 | 87.6 | | | |
| 80 | 99.6 | 87.2 | | | 43 | 53 | |
| 100 | 100 | 91.6 | 99.8 | 94.5 | 54.7 | 67.7 | 68.9 |
| 150 | | 97.7 | | | 78.2 | 88.8 | 84.6 |
| 200 | | | | | 91.3 | 96.9 | 92.7 |
| 250 | | | | | | 99.5 | |
| 300 | | | | | 98.1 | | 97.6 |
| 400 | | | | | 98.7 | | 98.5 |

TABLE 3

Combustion Products

% Passing

| Additive Size (micron) | Untreated ash | LS8.2 RC2.0 | LS4.0 | LS8.2 | LS8.2 SL2.0 | LS8.2 RG2.0 | LS8.2 SL2.0 RC2.0 K1.0 | LS8.2 SL2.0 RC2.0 K1.0 SF0.2 | LS8.2 SL2.0 RC2.0 RG0.25 K1.0 SF0.2 |
|---|---|---|---|---|---|---|---|---|---|
| 1 | 9.26 | 8.66 | 6.67 | 7.2 | 12.2 | 9.28 | 9.15 | 9.27 | 8.9 |
| 2 | 17.8 | 14.8 | 11.5 | 13 | 22.4 | 17.4 | 18 | 18.5 | 17.4 |
| 5 | 32.7 | 37.1 | 23.3 | 25.5 | 44.2 | 34.5 | 33 | 33.9 | 33 |
| 10 | 59.8 | 76.2 | 56.4 | 54.6 | 72.7 | 62.5 | 59 | 59.3 | 60.8 |
| 15 | 72.3 | 92.3 | 81 | 76 | 85 | 78.6 | 77.5 | 77.1 | 78.9 |
| 20 | 80.6 | 96.5 | 92.2 | 86.8 | 90.6 | 86.5 | 87.3 | 86.6 | 87.5 |
| 30 | 89.2 | 98.5 | 96.6 | 93.7 | 95.8 | 93.6 | 94 | 93.8 | 93.3 |
| 40 | 93.6 | 99.5 | 98.4 | 96.9 | 98.1 | 96.9 | 96.8 | 96.9 | 96.2 |
| 50 | 96.1 | 99.9 | 99.6 | 98.7 | 99.3 | 98.6 | 98.5 | 98.5 | 97.8 |
| 60 | 97.5 | 100 | 100 | 99.4 | 99.7 | 99.3 | 99.2 | 99.3 | 98.6 |
| 70 | 98.4 | 100 | 100 | 99.6 | 99.9 | 99.5 | 99.4 | 99.6 | 99.1 |
| 100 | 99.6 | 100 | 100 | 99.9 | 100 | 99.8 | 99.8 | 100 | 99.9 |

Limestone, granulated blast furnace slag and kaolin were injected in the combustion chamber of a coal combustion boiler with the following dosages: Limestone: 7.8 percent by weight of coal; Granulated blast furnace slag: 4.9 percent by weight of coal; and Kaolin: 1.4 percent by weight of coal. The total quantity of additives amounts to 14.1 percent by weight of coal.

The coal combusted in the test boiler produced 35.3 percent of untreated combustion product, before application of the additives. Thermogravimetric analysis showed the following results in Table 4 for total carbon content.

TABLE 4

| Material tested | Total carbon content (by weight of the tested material) |
|---|---|
| Combustion product (with additives) | 3.8 percent |
| Untreated combustion product (without additives) | 8.4 percent |

The reduction in weight percent of total carbon was partly due to dilution by virtue of adding additives, which dilute the relative content of carbon in the combustion product. The effect of such dilution was calculated as follows:

$$Cu - Cu*CPu/CPt$$

where Cu is the carbon content (in percent) of the untreated product, i.e. 8.4 percent; CPu is the amount of untreated combustion product (in percent by weight of coal), i.e. 35.3 percent; CPt is the amount of treated product (in percent by weight of coal), i.e. 35.3 percent, plus 14.1 percent. Therefore the reduction in carbon content attributable to dilution was 2.4 percent by weight of the combustion product. The reduction in carbon content attributable to better combustion efficiency by comminution of coal particles and the particles of additives inside the combustion chamber was 2.2 percent by weight of the combustion product. The total net effect of carbon reduction was 4.6 percent by weight of combustion product, or a 55 percent reduction as compared to the total carbon level in the untreated combustion product.

The invention provides a method and system to reduce disposal of coal combustion ashes in landfills by converting them into higher value hydraulic binders, usable as a substitute of cement in quantities in excess of 40 percent of substitution. Another advantage of the invention is that it provides a cost-effective alternative to other methods to beneficiate coals combustion ashes, such as external grinding facilities or existing technologies to reduce the proportional amount of free carbon, by applying the injection of treatment and materials in the combustion boiler, rather than at a separate facility. The method described herein enables treatment of the coal combustion ash as a part of the normal process of power generation, thereby reducing the need for transportation to a separate facility.

Whereas particular embodiments of this invention have been described above for purposes of illustration, it will be evident to those skilled in the art that numerous variations of the details of the present invention may be made without departing from the invention as defined in the appended claims.

The invention claimed is:

1. A method of producing a modified coal combustion product comprising combusting coal in the presence of a particle size-reducing additive, wherein the modified coal combustion product has an average particle size less than an average particle size of a coal combustion product combusted from the coal without the additive.

2. The method of claim 1, wherein the average particle size of the modified coal combustion product is at least 5 percent less than an average particle size of a coal combustion product combusted from the coal without the additive.

3. The method of claim 1, wherein the average particle size of the modified coal combustion product is at least 15 percent less than an average particle size of a coal combustion product combusted from the coal without the additive.

4. The method of claim 1, wherein the modified coal combustion product has an average particle size of less than 50 microns.

5. The method of claim 1, wherein the modified coal combustion product has an average particle size of less than 20 microns.

6. The method of claim 1, wherein the modified coal combustion product has an average particle size of from 5 to 20 microns.

7. The method of claim 1, wherein the modified coal combustion product has a carbon content less than a carbon content of a coal combustion product combusted from the coal without the additive.

8. The method of claim 7, wherein the carbon content is at least 10 weight percent less than a carbon content of the coal combustion product combusted from the coal without the additive.

9. The method of claim 7, wherein the carbon content is at least 50 weight percent less than a carbon content of the coal combustion product combusted from the coal without the additive.

10. The method of claim 7, wherein the carbon content of the modified coal combustion product is less than 5 weight percent.

11. The method of claim 7, wherein the carbon content of the modified coal combustion product is from 0.5 to 2 weight percent.

12. The method of claim 1, wherein the particle size-reducing additive has an average particle size of greater than 20 microns.

13. The method of claim 1, wherein the particle size-reducing additive has an average particle size of greater than 50 microns.

14. The method of claim 1, further comprising comminuting the particle size-reducing additive prior to the combustion with the coal.

15. The method of claim 1, wherein the particle size-reducing additive comprises at least one material selected from the group consisting of limestone, concrete, Portland cement concrete, recycled ground granulated blast furnace slag, recycled crushed glass, kaolin, recycled crushed aggregate fines, silica fume, cement kiln dust, lime kiln dust, weathered clinker, clinker, aluminum slag, copper slag, granite kiln dust, rice hulls, rice hull ash, zeolites, limestone quarry dust, red mud, ground mine tailings, oil shale fines, bottom ash, dry stored fly ash, landfilled fly ash, ponded fly ash, sopodumene lithium aluminum silicate materials, lithium-containing ores and combinations thereof.

16. The method of claim 1, wherein the particle size-reducing additive comprises at least two materials selected from the group consisting of limestone, concrete, Portland cement concrete, recycled ground granulated blast furnace slag, recycled crushed glass, kaolin, recycled crushed aggregate fines, silica fume, cement kiln dust, lime kiln dust, weathered clinker, clinker, aluminum slag, copper slag, granite kiln dust, rice hulls, rice hull ash, zeolites, limestone quarry dust, red mud, ground mine tailings, oil shale fines, bottom ash, dry stored fly ash, landfilled fly ash, ponded fly ash, sopodumene lithium aluminum silicate materials, lithium-containing ores and combinations thereof and combinations thereof.

17. The method of claim 1, wherein the particle size-reducing additive comprises limestone, blast furnace slag, concrete, glass, kaolin and combinations thereof.

18. The method of claim 1, wherein the particle size-reducing additive comprises at least 8 weight percent of the total combined weight of the coal and the additive.

19. The method of claim 18, wherein the particle size-reducing additive comprises greater than 10 weight percent.

* * * * *